United States Patent [19]

Behnke

[11] 4,360,875

[45] Nov. 23, 1982

[54] AUTOMATED, DOOR-TO-DOOR, DEMAND-RESPONSIVE PUBLIC TRANSPORTATION SYSTEM

[76] Inventor: Robert W. Behnke, 2010 Wembley Park Rd., Lake Oswego, Oreg. 97034

[21] Appl. No.: 236,858

[22] Filed: Feb. 23, 1981

[51] Int. Cl.³ .............................................. G06F 15/48
[52] U.S. Cl. .................................... 364/436; 340/22; 364/900
[58] Field of Search ... 364/200 MS File, 900 MS File, 364/436; 340/22-24; 246/5, 187 B

[56] References Cited

U.S. PATENT DOCUMENTS

| | | | |
|---|---|---|---|
| 3,268,727 | 8/1966 | Shepard | 246/187 |
| 3,533,084 | 10/1970 | Cook et al. | 364/900 |
| 3,568,161 | 3/1971 | Knickel | 364/900 |
| 3,895,584 | 7/1975 | Paddison | 246/187 B |
| 3,953,714 | 4/1976 | Gabillard | 246/187 B |
| 4,015,804 | 4/1977 | Dobler et al. | 246/5 |
| 4,023,753 | 5/1977 | Dobler | 246/5 |
| 4,092,718 | 5/1978 | Wendt | 364/436 |
| 4,122,523 | 10/1978 | Morse et al. | 364/436 |
| 4,181,945 | 1/1980 | Adler et al. | 364/436 |
| 4,208,717 | 7/1980 | Rush | 364/426 |
| 4,212,069 | 7/1980 | Baumann | 364/436 |

OTHER PUBLICATIONS

Billström, O; "A Taxi Communication System"; Proc. of IEEE Vehicular Tech. Conf.; Arlington Heights, Ill. Mar. 27-30, 1979; pp. 307-308.
Bennett et al.; IBM Tech. Discl. Bull., vol. 14, No. 2; pp. 438-440, (Jul. 1971); "School Bus Scheddling with Several Objectives".

Primary Examiner—Errol A. Krass
Attorney, Agent, or Firm—Chernoff & Vilhauer

[57] ABSTRACT

A flexible-route transportation system, primarily utilizing privately-owned vehicles to provide ridesharing transportation for the public, is described. Interactive communications terminals are provided through which drivers of the vehicles may rapidly transmit ride offers via a telecommunications network to a central operations coordinating station, equipped with a general-purpose programmable computer. Rider interactive communications terminals, located at public and private facilities, are also connected by the telecommunications network with the central coordinating station, permitting eligible members of the public to quickly request rides from one location to another. The central coordinating station matches the ride requests with the ride offers, on a trip-by-trip basis, comparing the driver's indicated origin, destination, seating requirements and time with the rider's requested origin, destination, seat availability and time. If a ride offer and ride request can be matched within reasonable limits of space and time, the central coordinating station transmits to the driver the rider's identity and location and transmits to the rider the description and identity of the vehicle, so that the driver can pick up and drop off the rider en route to his or her destination. The system includes security features for preventing unauthorized access to the system by either drivers or riders, accounting features for properly billing riders and reimbursing vehicle owners for transportation services, and special terminals for entering trip information quickly and accurately.

33 Claims, 6 Drawing Figures

AUTOMATED, DOOR-TO-DOOR, DEMAND-RESPONSIVE PUBLIC TRANSPORTATION SYSTEM

BACKGROUND OF THE INVENTION

This invention relates to a door-to-door transit system which primarily utilizes privately-owned vehicles to provide high-volume, low-cost, energy-efficient and ecologically-sound transportation services for the public, including the aged and the handicapped.

In view of the critical transportation, environmental and energy problems now facing the world, new approaches are constantly being sought to reduce the dependence upon single-passenger automobile trips for transportation. Unfortunately, attempts to eliminate the single-passenger auto have met with only limited success to date. Consequently, gasoline consumption, traffic congestion and air pollution levels remain high.

Although great emphasis has been placed on mass transit systems to alleviate these problems, mass transit systems are extremely costly to build and operate. Bus systems require large outlays for vehicles and operating personnel, while fixed-guideway systems require capital expenditures many times greater than those required for bus systems. Equally important, the fact that both high-volume bus systems and fixed-guideway systems must adhere to predetermined routes, makes it impossible for such systems to provide door-to-door service for most citizens.

Door-to-door transportation service is a requirement for many aged and handicapped persons. Door-to-door service is also desirable for other riders, since the time and energy required to get riders to and from transit stations reduces both the convenience and the energy efficiency of mass transit systems. Although taxis, jitneys and dial-a-ride minibuses offer door-to-door convenience, the necessity of having a driver who makes his living providing such service to relatively few riders renders it far too expensive for most citizens to use on a regular basis. Hitchhiking is too dangerous to consider as a viable transportation system.

Although one of the least energy efficient forms of transportation is an automobile with a single occupant, one of the most energy efficient forms is an automobile with several occupants. Car pools, van pools and other ridesharing programs have been encouraged to reduce petroleum consumption while providing riders with economical, door-to-door transportation services. The advantages of ridesharing are well-known. By increasing the average number of passengers in each vehicle, the number of vehicle-miles can be reduced while keeping the number of passenger-miles constant. By sharing the operating costs both the rider and the driver save money, while gasoline consumption, parking, traffic congestion and air pollution problems are all reduced.

Despite these benefits and an intensive advertising campaign, 75% of all workers who commute by automobile drive by themselves. One of the reasons for this is the absence of suitable backup transportation for commuters who rideshare, such backup transportation being needed whenever a driver's or a rider's itinerary changes. Because noncommuter travel is less regular and repetitive than commuter travel, conventional ridesharing techniques have been used even less for this type of travel. Noncommuter travel currently represents 60% of all automobile trips.

Our existing automobiles and roads constitute an effective door-to-door transportation system for many citizens. Because of the low occupancy rate of the vehicles, however, it is a very inefficient system. Furthermore, the system is not always responsive to the needs of those who either cannot afford an automobile or cannot drive. What is required is a method for using the existing inventory of empty auto seats on our highways to respond to the transportation demands of the general public, including the aged and the handicapped, on an individual trip basis. Voice systems, currently used by radio-dispatched taxi and dial-a-ride minibus services, are too slow and too labor-intensive to be used for high-volume transportation systems. The volume of information to be processed and the time constraints mandate that such a door-to-door, demand-responsive system be automated in all but the smallest towns.

In recent years a number of automated, demand-responsive mass transit systems have been developed with a view toward increasing their efficiency and cutting their cost of operation. Among these are the systems shown in the following U.S. Pat. Nos.: 3,268,727, 4,023,753, 3,895,584, 4,092,718, 3,953,714, 4,181,945, 4,015,804, 4,208,717. Also of interest is Bennett et al, *IBM Technical Disclosure Bulletin,* Volume 14, No. 2, pages 438–440 (July 1971). Most of these systems apply to fixed-guideway mass transit systems, although U.S. Pat. No. 4,092,718 and the IBM Technical Disclosure Bulletin pertain to bus systems. In every case, however, the mass transit system involves vehicles traveling along predetermined routes between predetermined stations. That is, each vehicle in the system has respective origins and destinations which bear a predetermined route relationship to one another. The stations do not vary according to current rider needs. Accordingly, these systems share the major disadvantages of other mass transit systems in their high capital costs and inability to provide door-to-door transportation.

Unfortunately such automated, demand-responsive transportation systems of the fixed-route, station-to-station type are not easily adapted to a flexible-route system because of the many unique problems presented by door-to-door service. In order to be effective, a high-volume door-to-door system requires many more vehicles of smaller seating capacity than a station-to-station system. A door-to-door system must also be able to instantaneously match a large number of different ride requests with an equally large number of different ride offers. Common routing is not the only criterion for effective matching. Timing and seating needs of riders require matching with timing and seating capacities of vehicles.

Because of the volume and complexity of the data required in a trip-by-trip scheduling system, special computer terminals should be used to permit both drivers and riders to enter trip information quickly and accurately and transmit this information to a computer for driver-rider matching. This matching must be accomplished on a real-time basis in response to current demands, and without the need for human intervention.

In order to minimize capital costs, most of the transit vehicles should be privately owned. In order to minimize operating costs, extensive use should be made of volunteer and part-time drivers, particularly during peak traffic periods. The security of private citizens who do not know each other but nonetheless share rides with each other must be ensured. The current suitability, from a point of view of safety and liability, of private vehicles and their drivers to transport riders must be monitored continuously. Furthermore once a vehicle is assigned to a rider or group of riders, some method must be provided to ensure that vehicles and riders will make proper connections. The ability to deal with all of these variables on an instantaneous, real-time basis is far beyond the capability of known fixed-route automated transportation systems.

SUMMARY OF THE PRESENT INVENTION

The present invention is directed to an automated public transportation system adapted for high-volume usage and capable of providing door-to-door transportation while requiring a much smaller cost to build and operate than fixed-route mass transit systems. It is basically a ride-sharing system which makes use of modern communications and computerized control techniques to provide public ridesharing in an organized manner with sufficient instantaneous, demand-responsive flexibility to eliminate the present drawbacks of other ridesharing systems such as carpools and the like. Its extreme flexibility offers the potential of extending the benefits of ridesharing to noncommuter travel. It should also stimulate the growth of carpools and van pools by providing convenient backup transportation services, thereby eliminating a primary objection to conventional ridesharing systems.

The high-cost characteristics of other mass transit systems is eliminated in the present system by the use of existing roads and privately-owned vehicles whose drivers offer ridesharing services on a trip-by-trip basis to the public through a communications and automatic computerized coordinating network. Interactive terminals are provided, at fixed locations and/or in vehicles, having registers of any suitable type for the entry of information, through which drivers of the vehicles may transmit ride offers by telecommunications to a central coordinating station containing a general-purpose, programmable computer. Each ride offer indicates an origin and destination determined by the driver of the vehicle, such origin and destination therefore having no predetermined route relationship to one another. Rider interactive communications terminals are provided at public and private locations connected by telecommunications networks with the central coordinating station for permitting licensed members of the public to request rides from any origin to any destination in the area served by the system, such origin and destination likewise having no predetermined route relationship to one another. The central coordinating station coordinates the ride requests with the ride offers, comparing the driver's indicated origin and destination with the rider's requested origin and destination. Variable times and seating for ride requests and ride offers are also compared.

If a ride offer and ride request can be matched within predetermined geographical, time and seating limits, the central coordinating station transmits to the driver the rider's location (and preferably transmits to the rider a description of the driver's vehicle for recognition purposes) thereby instantly matching the rider with a ridesharing vehicle and enabling the driver to pick up the rider. The matching process is accomplished to enable the driver to pick up the rider either close to his own origin or by stopping or detouring slightly along his route. According to the matching process, the rider's destination will be close to the driver's destination or generally along the driver's route.

The system also includes security features for preventing unauthorized access to the system by drivers or riders, continuous monitoring of the suitability or eligibility of currently authorized drivers and riders to participate in the system and accounting features for billing riders and reimbursing vehicle owners for transportation services.

Accordingly, it is a principal objective of the present invention to provide low-cost, energy-efficient, door-to-door transportation services usable by the public on a high-volume basis.

It is a further principal objective of the present invention to provide public access to transportation by privately-owned vehicles on an instantaneous, trip-by-trip ridesharing basis, thereby increasing the utilization of ridesharing not only for commuter travel but also enabling the use of ridesharing for noncommuter travel.

It is a further principal objective of the invention to give the public access to ridesharing vehicles by means of a highly automated system. This system links riders and drivers by telecommunications to data processing equipment which automatically and instantly matches riders with ridesharing vehicles according to origins and destinations indicated by riders and drivers.

It is a further principal objective of the invention to enable both riders and drivers to enter and receive trip information directly from a central computer system via easy-to-use electronic terminals. These terminals are designed to permit users to enter trip information quickly, accurately and with minimum training. Furthermore, when these terminals are not being used for transit applications, they may also be used to store, retrieve and process other types of data.

The foregoing and other objectives, features and advantages of the present invention will be more readily understood upon consideration of the following detailed description of the invention taken in conjunction with the accompanying drawings.

DESCRIPTION OF THE PREFERRED EMBODIMENT

Figure 1:
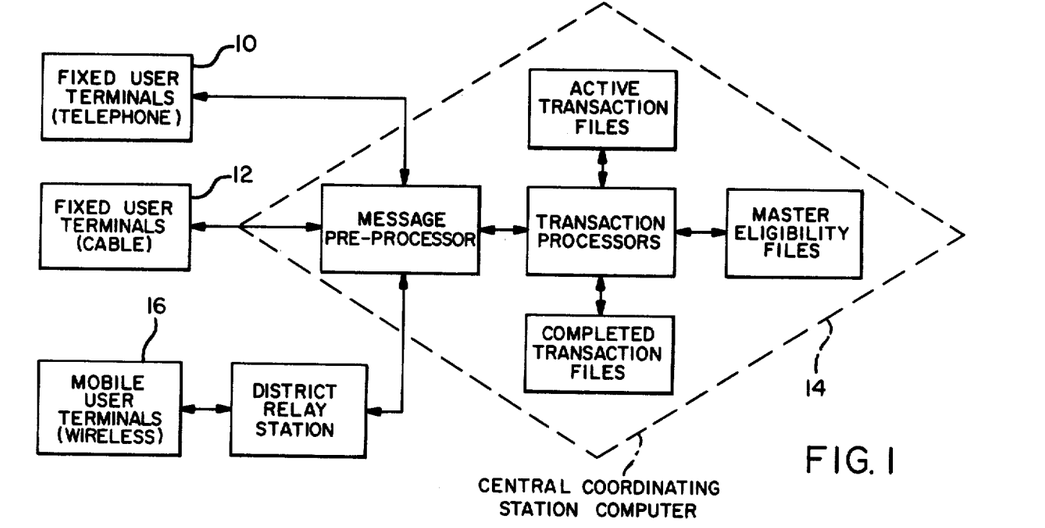
FIG. 1 is a schematic diagram of the major components of an exemplary system in accordance with the present invention.

In FIG. 1 the major components of a preferred embodiment of a door-to-door public ridesharing system in accordance with the present invention are shown schematically. Prospective riders can request rides by utilizing electronic terminals such as 10 and 12 located in fixed locations such as their homes, offices, shops or public booths. These easy-to-use terminals are connected directly to a central coordinating station computer 14 by telephone lines and/or cable. Drivers of vehicles can offer rides by means of the same type of fixed terminals or, preferably, by means of similar mobile terminals such as 16 located in each privately-owned vehicle in wireless communication with the central coordinating station computer 14. Some riders may also use wireless terminals such as 16 to communicate with the central coordinating station.

The central coordinating station preferably includes a general-purpose, programmable computer 14 capable of automatically processing ride offers and ride requests received from the respective terminals 10, 12 and 16 in the form of electromagnetic signals, with no human assistance or intervention being required. (As used herein, the term "electromagnetic signals" includes signals confined to electrical circuits as well as signals in any type of wave form.) However, if desired for greater public convenience, some telephone operators could be provided at the central coordinating station to accept conventional telephone ride requests and/or ride offers from persons not having access to terminals such as 10, 12, and 16.

Figure 2:
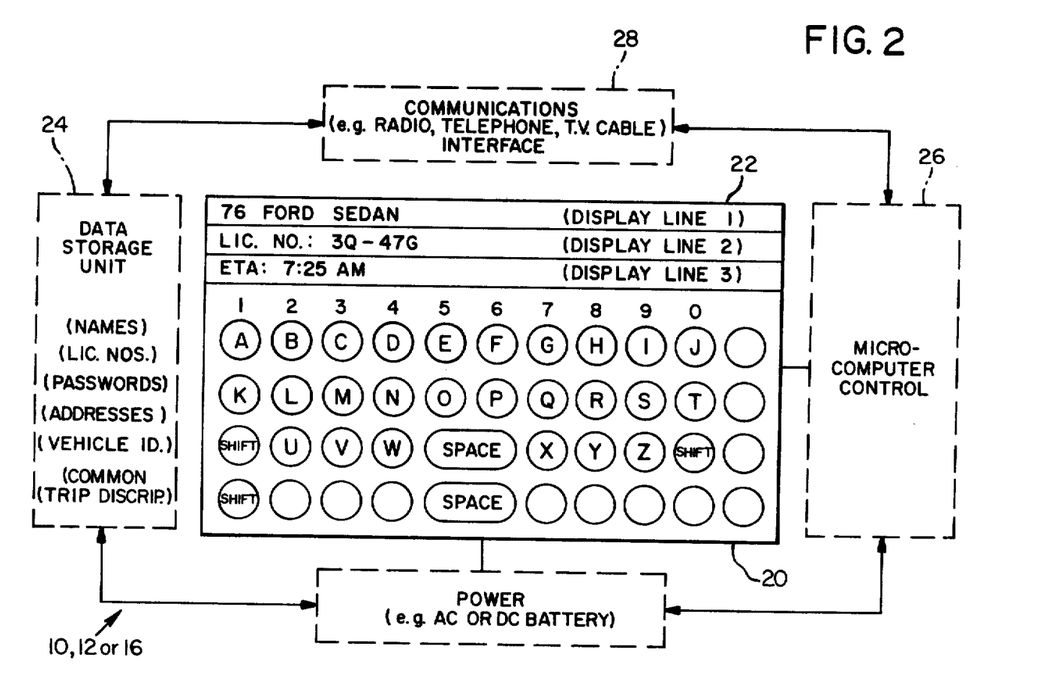
FIG. 2 depicts an exemplary driver or rider terminal schematic by which ride offers and ride requests may be transmitted by users of the system and through which messages may be received.

FIG. 2 illustrates an exemplary terminal of the type suitable for any of the terminals 10, 12 or 16. Each such terminal contains a digital register, indicated generally as 20, by which the rider or driver can enter certain variable information, to be described in detail hereafter, enabling the system to determine and verify the rider or driver's identity, eligibility to use the system, and the details of his ride offer or ride request. The terminal also contains a display, usually a visual display indicated generally as 22, by which the system can interrogate the rider or driver and also provide instructions and other messages. Each terminal is an interactive terminal that is connected by two-way telecommunications with the central coordinating station computer 14.

While it is not critical that the terminal itself store any data or be programmed in any way, it is preferable that each terminal contain some capacity in these regards in a data storage unit and microcomputer control unit indicated generally as 24 and 26 respectively to make the terminals easier to use, to relieve some of the communications load between the terminals and the central coordinating station computer 14 and to relieve some of the data storage and processing requirements of the central coordinating station computer. In this regard, the microcomputer control 26 preferably contains sequential user interrogation programming and user identity-verification programming, to be explained hereafter. The data storage unit 24 of each privately-owned terminal may contain the terminal's serial number, coded names of regular users, their system enrollment or "license" numbers, security "passwords" associated with the respective users, coded addresses commonly used in the area, coded addresses unique to the users, the identity of the vehicle owned by each driver-user, and coded descriptions of trips habitually taken by the user. Publicly accessible terminals likewise contain similar programming in a microcomputer control 26, and the storage of data unique to the users of the terminal could be contained in or on individual insertable-removable data storage units in the form of unique cards or other devices carried by each respective user.

Electronic devices that could be used as interactive terminals in the present system are currently available on the market. For example, a convenient portable digital computer terminal with visual display and interchangeable plug-in programmable modules is marketed under the model designation LK-3000 by Nixdorf Computer AG of West Germany and Nixdorf Computer Personal System, Inc. of Burlington, Massachusetts. The same companies also market on acoustic telephone coupler which permits the terminal to communicate over standard telephone lines with any computer system. A somewhat similar interactive terminal is sold under the trademark RDX 1000 by Motorola Communications and Electronics Inc. of Schaumburg, Illinois and is adaptable for two-way communication with a computer either through an FM radio link or a landline communications link. The latter terminal with an FM radio link would, for example, be suitable for mobile vehicle-mounted terminals in the present system. Both of the foregoing exemplary units feature a one-line visual display; however, it would be preferable for use in the present system to modify such units to provide a three-line display or to display the information on the screen of a television set connected to the terminal. It would also be desirable to modify such units to be able to store and retrieve trip information unique to each geographical area and to each user in order to make them easier and faster to use.

Some of the terminals (particularly public-access terminals) may include special security devices to permit operation by licensed users only. One such security device, a magnetic-stripe credit card reader, is now used by banks to permit credit card holders with the proper password to obtain cash from automatic teller devices. Other security devices might include equipment for recording and transmitting voice prints, fingerprints, or other identifying information. Other optional terminal facilities might include special input and output equipment or devices. For example, register inputs can be by keyboard, voice, pointer, or dial; display outputs can be by alphanumeric display, video tube, printer, voice or braille.

The other primary component of the present system, the central coordinating station computer 14, may be virtually any standard large-scale general purpose programmable computer of sufficient capacity to process ride offers and ride requests in the manner to be described hereafter and in the volume to be expected for a particular transportation area. General purpose computers of this type are manufactured by companies such as IBM, Control Data Corporation and Digital Equipment Corporation and are commonly used for hotel or airlines reservation systems.

OPERATION

Figure 3:
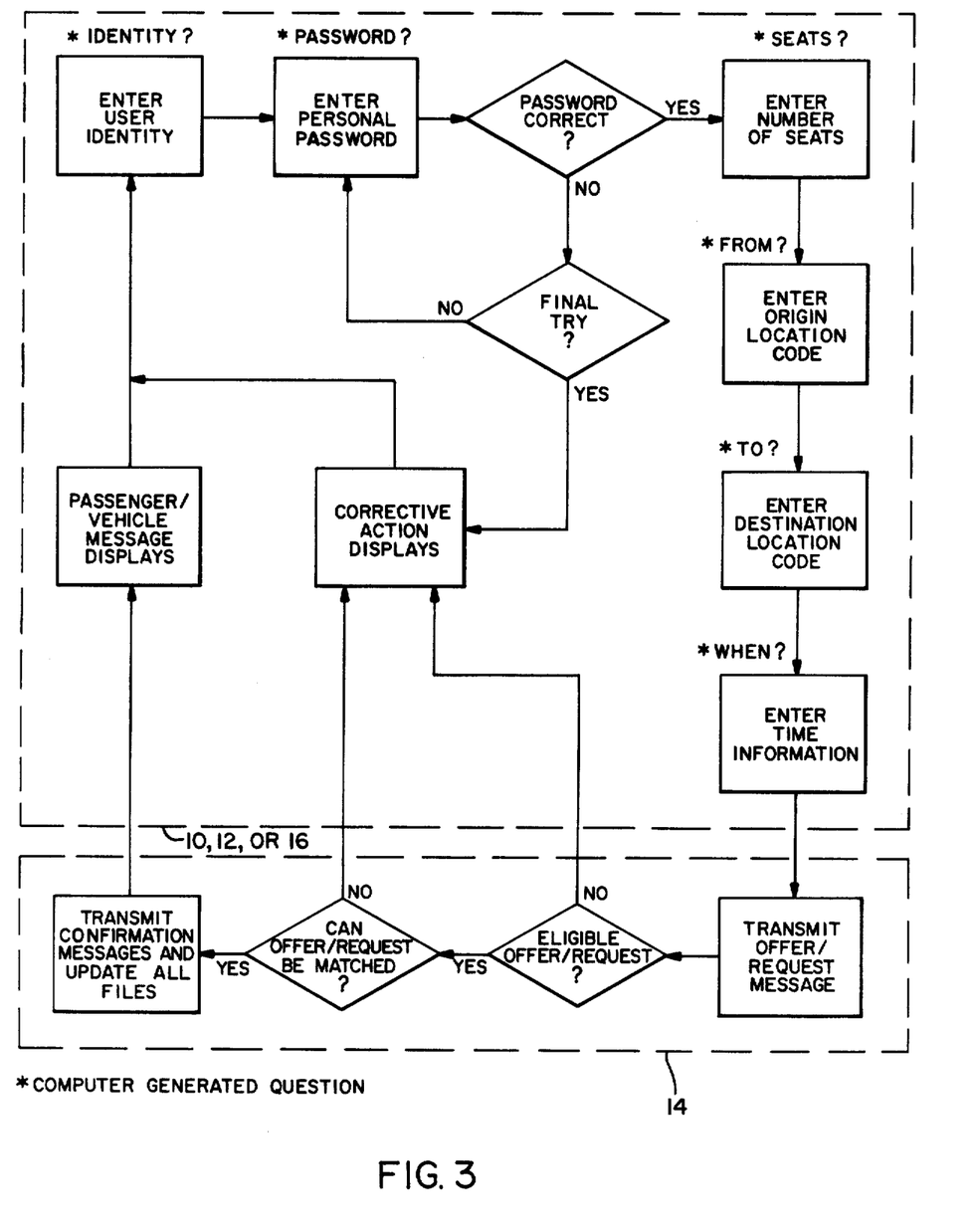
FIG. 3 is a logic flow chart illustrating the exemplary function of a driver or rider terminal having an integral microcomputer control, and illustrating in simplified form the interaction of the terminal with a central coordinating station computer.

FIG. 3 depicts schematically the interaction between an exemplary terminal 10, 12 or 16 and the central coodinating station computer 14. The central coordinating station processes only ride offers or ride requests from authorized users of the system. These are persons who have applied for and been granted individual licenses to use the system either as drivers or riders or both. Persons who have applied to be licensed only as riders will have been required to provide adequate credit and personal references in order to obtain their licenses. Persons who wish also to be authorized as drivers will have additionally been required to satisfy predetermined requirements with respect to vehicle operator licensing, proper liability insurance and vehicle safety inspection.

Because of the importance, for purposes of security, of limiting access to the system to licensed users only, the user's identity and a unique coded indicia or "password" associated with such user are the first two items which the user must enter on the terminal. The terminal will display "IDENTITY?" and the user will usually enter a single character which the terminal storage unit 24 automatically translates into a full user license number. Alternatively, if the user is at a public terminal or at a friend's house, he may have to enter his full license number or use a special data input device if the terminal is so equipped.

After the user's identity has been entered, the terminal displays "PASSWORD?". The user then enters this information, usually less than eight characters. The password will often be a relative's birthdate or maiden name that is easy for the user to remember. If the terminal is a private one, the terminal's data storage unit 24 contains security data matching the identity of each person normally using the privately-owned terminal with a respective unique password corresponding to such person, and the microcomputer control 26 compares the identity and password entered by the user with the corresponding identity and password stored in the data storage unit 24 to determine if the two match. If the match is satisfactory, the terminal then displays "SEATS?", asking for additional information. Alternatively, if the password entered does not properly match the identity entered, the terminal continues to display the word "PASSWORD?" until a valid password is entered. If the user's failure to enter the proper password continues for a predetermined number of tries, the terminal takes corrective action, for example, by sounding an alarm buzzer or visually displaying a message such as "PASSWORD INVALID" or by transmitting an alarm message to the central computer. No ride request or ride offer is processed until a satisfactory match of identity and password is made, thereby verifying that the user is licensed to use the system. For public terminals not adapted for the insertion of individual data storage units, such verification could be carried out at the central coordinating station computer 14 rather than by the terminal.

Once a user's identity and password have been satisfactorily matched, the terminal then requests information concerning the details of the user's ride offer or ride request in the sequence indicated in FIG. 3 by the displayed inquiries "SEATS?", "FROM?", "TO?" and "WHEN?". In response to the inquiry "SEATS?", the user enters the number of seats available for riders in his vehicle if he is transmitting a ride offer, or the number of seats required for his trip if he is transmitting a ride request.

The next inquiry "FROM?" is optional for terminals in fixed locations since, in most cases, the driver or rider's origin will be the same as such fixed location and therefore stored in the terminal's data storage unit 24 so that it can be automatically transmitted to the central coordinating station computer 14. However, for mobile terminals such as 16, in radio communication with the central coordinating station, the inquiry "FROM?" would be utilized to permit the terminal user to register his present variable location. The preferred way to enter and process geographic locations corresponding to origins and destinations is to prestore commonly used addresses, such as a person's home, place of employment, school and other locations, in the storage unit of the terminal of the control computer. For such commonly used locations, the user is simply required to register a single coded character such as "H" for home or "W" for work, which the terminal automatically converts to an address to be transmitted to the central coordinating station. The preferred way to enter and process variable geographic locations corresponding to driver and rider origins and destinations that have not been prestored in the terminal or computer is by telephone numbers corresponding to the locations, or by neighborhood codes although the capability for entering narrative location descriptions should not necessarily be foreclosed. The central coordinating station computer 14 contains stored data matching telephone numbers with their addresses and is therefore automatically able to convert such numbers into neighborhood code or detailed addresses without requiring the entry of a large number of characters by the users.

After entry of the "FROM?" information, the terminal then displays the word "TO?", to which the user responds by entering his intended destination by means of coded indicia or telephone number.

The next inquiry displayed by the terminal, "WHEN?", is optional since the system can alternatively interpret all ride offers and ride requests to be effective immediately upon entry. However, affording the user the opportunity to enter variable time information adds flexibility to the system by enabling him to offer or request rides in advance.

Figure 4:
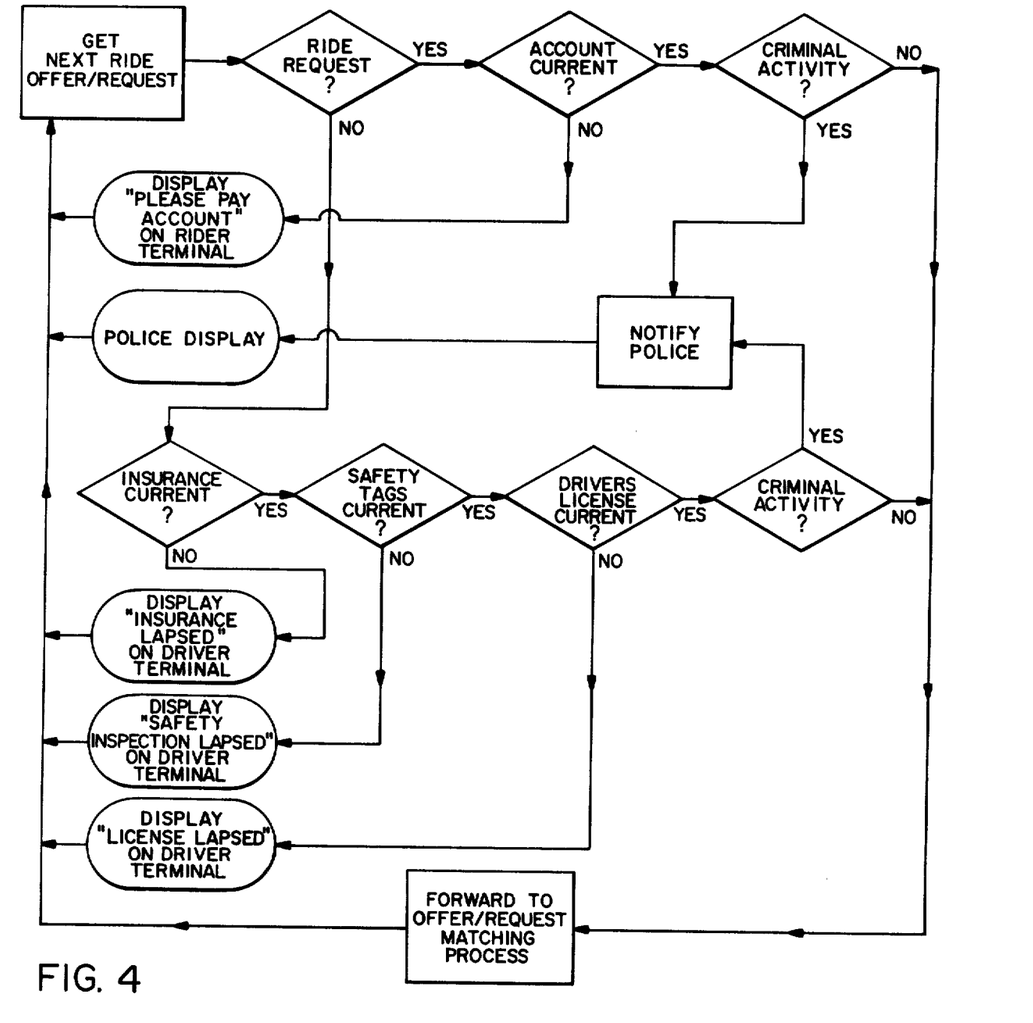
FIG. 4 is a logic flow chart indicating an exemplary process by which the central coordinating station computer automatically limits use of the system to eligible drivers and riders.

All of the foregoing ride offer or ride request information is transmitted from the terminal to the central coordinating station computer 14 which first checks the current eligibility of a particular licensed rider or driver to use the system. Because the system contemplates the involvement of large numbers of citizens authorized as drivers and/or riders to use the system, the security and safety of these persons and the financial stability of the system require that current information be stored and constantly updated with respect to each user to ensure that he remains eligible to use the system after his initial application for licensing has been approved. The logic flow chart of FIG. 4 illustrates exemplary checks of current, updated information pertaining to each licensed user which the central computer 14 makes with respect to each user who transmits a ride request or ride offer. As indicated in FIG. 4, to determine whether a rider is currently eligible, the status of such rider's account with the system is checked to determine whether his payment for fares is current and whether he is within his authorized credit limit. If his account is unsatisfactory, the computer 14 takes corrective action by transmitting an appropriate display to the rider's terminal, such as "PLEASE PAY ACCOUNT" as shown in FIG. 4. Similarly, a check is made to determine whether there is any indication of recent criminal activity which might render the rider an unsafe passenger for a driver. Police authorities would be notified if a criminal was detected so they could take appropriate action. With respect to ride offers, the computer 14 stores current eligibility data regarding such matters as liability insurance coverage, status of vehicle safety inspections, operator's license status and criminal activity relative to respective drivers and their vehicles as depicted in FIG. 4 to determine whether the driver and/or his vehicle remain currently eligible to participate in the system.

Such eligibility requirements must all be satisfied prior to the computer's forwarding a ride offer or ride request to the next processing step, i.e. that of matching ride offers with ride requests.

The matching process is carried out automatically by the central coordinating station computer 14 by receiving and storing all eligible ride request and ride offer data in an active transaction file and comparing currently active ride offers (within a predetermined time boundary) with currently active ride requests. Terminals in homes, offices, automobiles, etc. are continuously monitored by the central coordinating station computer 14 to determine if any ride requests or ride offers can be added. If a user's message is ready, and the central computer 14 is ready, the terminal will automatically transmit the message to the computer 14. Each user may also cancel any ride request or ride offer if he so desires by registering appropriate cancellation indicia on his keyboard, in which case the computer 14 removes the ride offer or ride request from its active transaction file and, if necessary, advises concerned parties of the changes.

Figure 5:
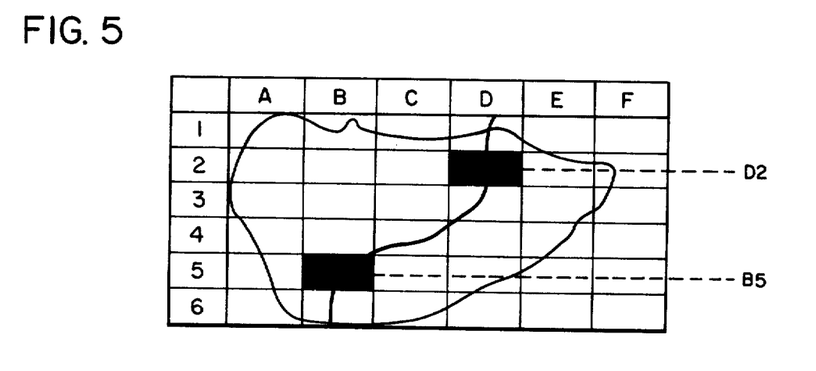
FIG. 5 depicts an exemplary grid used by the central coordinating station computer to geographically match ride offers with ride requests.
Figure 6:
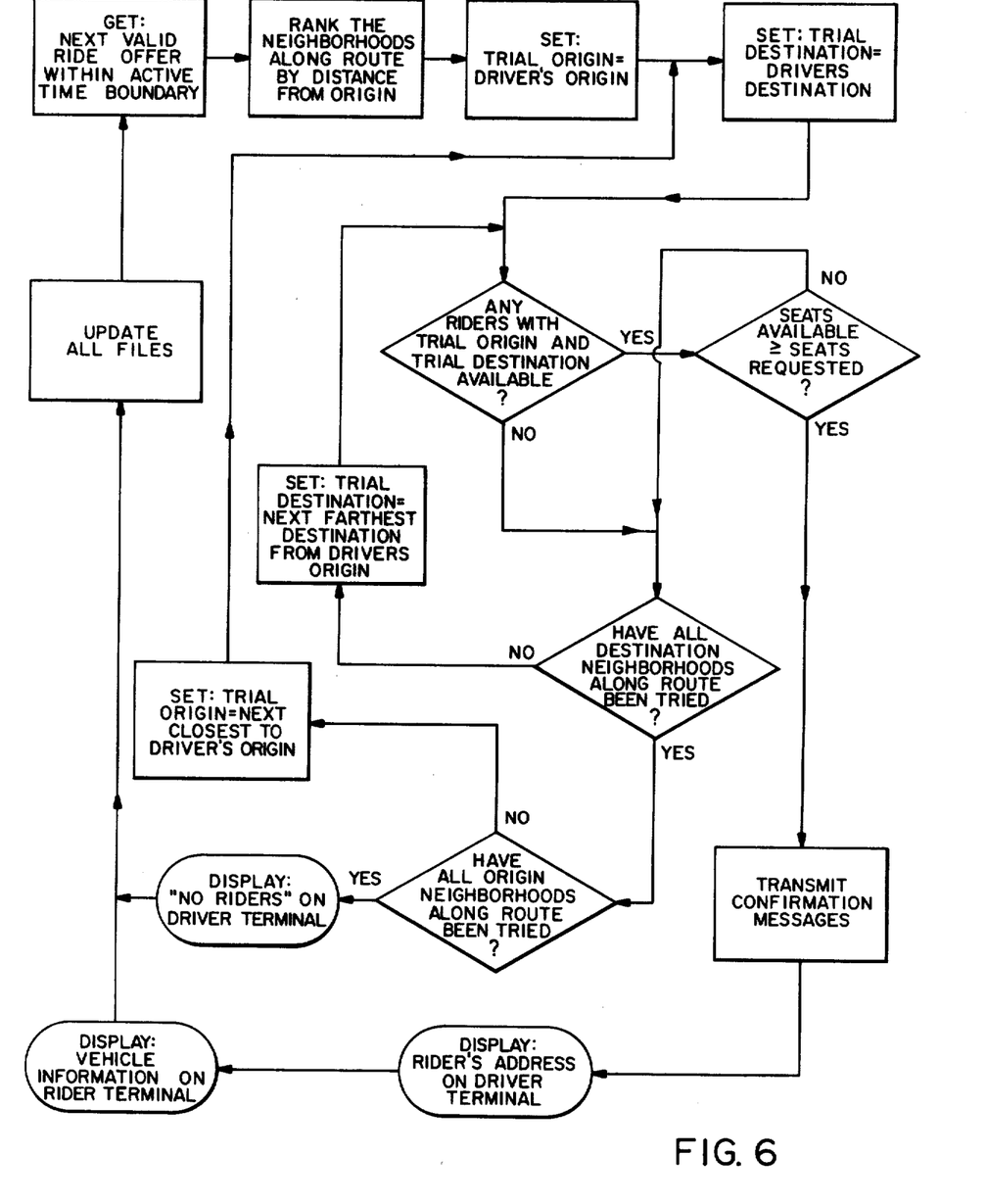
FIG. 6 is a logic flow chart indicating an exemplary process by which the central coordinating station computer geographically matches ride offers with ride requests.

The logical process by which the computer 14 matches ride offers with ride requests will be explained with respect to FIGS. 5 and 6. In FIG. 5, a rectangular grid has been applied to an exemplary geographical area served by a transportation system in accordance with the present invention. Each block defined by the grid represents a "neighborhood", and each neighborhood is assigned a "neighborhood code" such as "D2" or "B5". Each address stored in the central coordinating station computer 14 or data storage unit 24 is assigned the "neighborhood code" designating the neighborhood in which such address is located. The "neighborhood" and "neighborhood code" could alternatively be based on postal zip code areas, telephone prefix numbers areas, or other appropriate geographical neighborhood arrangements.

Each ride request and ride offer as stored in the active transaction file is coded with respect to its origin neighborhood code and destination neighborhood code. This enables each current ride offer to be compared with the current ride requests in the active transaction file by means of such codes and to be matched to a respective ride request in accordance with a predetermined matching procedure. As can be seen from the flow chart of FIG. 6, the matching procedure operates on the principle that the only riders which should be matched with a particular driver are those whose indicated origins and destinations do not require the driver to detour far from a direct route between his own intended origin and destination. Moreover, of those potential riders whose origins and destinations satisfy this test, the rider to be given priority is generally the one who will travel the furthest distance with the particular driver. Accordingly, pursuant to FIG. 6, the computer first attempts to find a rider whose origin neighborhood code and destination neighborhood code are the same as the driver's origin and destination codes. If such a rider can be found, he is matched with the driver unless he requires more seats than the driver has indicated to be available. In some cases it may be necessary to assign a large rider group to more than one vehicle. Since a rider may request multiple seats for his party, the term rider should not be viewed only as an individual but alternatively as a group. If no such rider is available, the computer next checks to determine whether any rider, having the same origin neighborhood code as the driver, has a destination code corresponding to the next farthest neighborhood code along the intended route of the driver. If an appropriate rider can still not be found, the computer systematically checks for rider destination codes along the driver's intended route which are gradually closer to the driver's origin code. If an appropriate rider cannot be found by means of this procedure, the computer considers riders whose origin is in the neighborhood closest to the driver's origin along the driver's route. The computer then begins checking for riders having the same destination code as that of the driver, and if necessary such checking continues sequentially with respect to rider origin codes which are gradually closer to the driver's destination code.

In FIG. 5, for example, assuming that the driver's origin code is B5 and his destination code is D2, if the computer cannot find a rider having the same origin and destination codes, it might assign a rider having an origin code of B5 and a destination code of D3 or, failing this, a rider having an origin code of B5 and a destination code of C4 or, failing this, a rider having an origin code of C4 and a destination code of D2.

Either the central computer or the rider could divide a trip into two or more segments for faster service. For example, if the trip between neighborhoods B5 and D2 in FIG. 5 is not heavily traveled during holidays, the rider or the computer might request a ride from B5 to C3 and then a ride from C3 to D2. The central computer 14 can also be programmed to collect detailed statistical data on trips between each neighborhood during commuting hours, weekends, holidays etc. This origin-destination data can then be used by the central computer to adapt the rider-driver assignment strategy to provide improved service for users of the system.

Comparable computer programs for matching riders and drivers according to origins and destinations in a flexible-route system are well known in the field of computer-based carpooling systems, but such systems use computers only for planning and design of the system, and not for real-time, trip-by-trip demand-responsive matching. Nor do such systems employ terminals by which current ride-requests or ride offers can be entered on a trip-by-trip basis directly by users of the system.

As soon as a rider has been matched with a driver, the computer transmits confirmation messages to the driver and, preferably, also to the rider. Since this is a point-to-point system, the driver should be informed at least as to the rider's location, and preferably also as to the rider's identification. The computer 14 therefore transmits this information to the driver's terminal which presents it visually on the display 22.

Similarly, for the rider's security and to ensure that a proper connection is made, the rider should be informed as to the vehicle's identity and estimated time of arrival. The computer 14 therefore likewise transmits this information to the rider's terminal for display thereon.

If the computer is unable to match a particular driver with a rider within a predetermined period of time, it transmits the display "NO RIDERS" to the driver and cancels the ride offer, thereby permitting the driver to proceed on his way. Unmatched ride requests remain in the active transaction file until they are canceled by the rider or until a predetermined period of time has expired. The rider would then have to re-enter the request.

If a rider and driver are matched, the computer 14 automatically charges the rider's account for a fare appropriate to the rider's indicated origin and destination, and bills the rider periodically for his accumulated charges. The computer may also enter credit to the driver's account and send him periodic payments for his accumulated fares. Similar computer accounting, billing and payment procedures are conventionally used at present by utilities and financial institutions. Since only a small portion of current transportation fares are needed to support this transit system, the remainder of the fares can be used to reimburse drivers, subsidize taxi, bus or rail operations, repair roads, etc.

EXAMPLE

John Smith resides with his parents at 21 Kaiholu Place, Kailua, Hawaii. He works at the Honolulu International Center (HIC) at Kapiolani Boulevard and Ward Avenue and attends the University of Hawaii at night. John uses his mother's maiden name, Jones, as his personal security password in order to request a ride. He is licensed to use the family car to offer rides on Mondays. The rest of the week, John requests rides to commute to work and night school.

Mary Tamura lives at 71 Kalaheo Place, a few blocks from the Smith residence. She requires a car for her employment as a visiting nurse. Because of her job requirements, driving record and willingness to provide transportation services, Mary Tamura is licensed to use her vehicle to offer rides every day. Today, her first call is in Waikiki. To get there, she could drive down Kapiolani Boulevard, past the HIC. She has already agreed to drive a neighbor to the Ala Moana Center en route. Mary Tamura uses her father's birthdate as her password to communicate with the central coordinating station. Her auto is a blue 1976 Ford-Sedan, license number 3Q-47G.

The following shows how John Smith would enter his ride request data in response to questions presented by the terminal in his home. It also shows how he would get a description of Mary Tamura's vehicle after the computer matched them.

TYPICAL RIDE REQUEST

| STEP NUMBER | COMPUTER DISPLAYS | USER ENTERS | EXPLANATION COMMENTS |
|---|---|---|---|
| 1 | IDENTITY? | 2 | John's family member code |
| 2 | PASSWORD? | JONES | He uses his mother's maiden name as security password. |
| 3 | SEATS? | 1 | Traveling alone today. |
| 4 | FROM? | H | Home (21 Kaiholu Place, Kailua) |
| 5 | TO? | W | Work (HIC, Honolulu) |
| 6 | WHEN? (short pause) | A | As Soon As Possible |
| 7 | 76 FORD SEDAN-BLUE LIC. No. 3Q-47G ETA: 7:25AM | | Description of Vehicle License Number Estimated Time of Arrival |
| TOTAL MESSAGE ENTERED - 2 JONES 1HWA (ten characters) | | | |

The terminal's microcomputer control and data storage unit would automatically translate John's coded entries (e.g. "H" equals 21 Kaiholu Place, Kailua, Hawaii 96734) into complete text for dispatching and display.

The following shows how Mary Tamura would enter her ride offer data and how she would receive John's address on her terminal. Since her family owns more than one automobile she will need to enter a code to identify the vehicle she will be driving so that the central coordinating station computer 14 can check its eligibility to transport passengers. Her destination entry is six characters longer than John's because she is using a phone number to specify her destination address. The central computer system will automatically convert this phone number into the address, 2341 Kalakaua Avenue, Waikiki, Hawaii 96815, and the proper neigborhood code.

TYPICAL RIDE OFFER

| STEP NUMBER | COMPUTER DISPLAYS | USER ENTERS | EXPLANATION COMMENTS |
|---|---|---|---|
| 1 | IDENTITY? | M | Mary's family member code |
| 2 | VEHICLE CODE? | F | 76 Ford Sedan 3Q-47G |
| 3 | PASSWORD? | 11-11-24 | She used her father's birthday as her security password. |
| 4 | SEATS? | 2 | Since Mary and a neighbor are riding together, only 2 seats are available. |
| 5 | FROM? | H | Home (71 Kalaheo Place, Kailua) |
| 6 | TO? | 285-4632 | Phone number of apartment at 2341 Kalakaua Avenue, Waikiki, Hawaii |
| 7 | WHEN? (short pause) | N | Now |
| 8 | JOHN SMITH (1) | | Name & number of passengers |
|  | 21 Kaiholu Pl. Kailua, HI 97034 | | Street Address. |
| TOTAL MESSAGE ENTERED - M F 11 11 24 2 H 285 4632 N | | | |

OTHER OPTIONAL FEATURES

As mentioned previously, terminals in homes, shops, offices or other nonmobile facilities can be programmed to automatically generate the origin code for a ride offer or ride request to eliminate the need to have the user key this information into the terminal each time it is used. This will not only simplify the operation of the terminal, it will also reduce errors. In addition, the microcomputer-controlled terminal can also be programmed so that a single character could represent a complete trip, including the number of seats, origin code, destination code and time. For example, the keyboard symbol "B" could represent John's regular request for a ride from home to work for one person at 8:00 a.m. and could therefore replace the entries "1, H, W, A". This procedure would also simplify operation of the terminal and reduce errors.

In addition, for commuters who plan to use this system for their daily trips to and from their jobs or schools, the central computer can be programmed to automatically generate a ride request or ride offer on a regular basis. This procedure would also minimize errors and reduce the communications and data processing workload of the central computer, particularly during peak travel times. A trip cancellation entry would be entered by the driver or rider whenever the routine schedule was modified.

The terminals can be designed so that changes to user identity codes, addresses, passwords, origin and destination information, and vehicle identity information can be made only by transit authorities. This would reduce theft of terminals and ensure that both the data storage in the terminal and the central computer were updated at the same time.

Alternatively, the terminals can be designed so that the user, after entering the proper password, could change this information in the terminals's microcomputer. The next time that the terminal was used, the new passwords and other data would be transmitted to the central computer and its files would be updated automatically. The central computer would then send a signal back to the microcomputer terminal to set a switch so that the changes would not have to be transmitted again.

The capabilities of the modern general purpose computer used in the central coordinating station computer 14 can also be used to provide a flexible fare structure that can be based on a fixed fee, mileage or zone charges, time of day, etc., or a combination of these factors. Billing adjustments can also be easily made for handicapped riders or senior citizens. Likewise, the credits for drivers may be adjusted if, for example, the drivers are a mix of volunteers and professionals.

In the event of a severe gasoline shortage, the central computer may also be used to provide fuel allocations on a passenger-mile basis, for example, which would be more equitable than the fixed number of gallons-per-month-per-vehicle formula suggested during past crises.

Vehicles to be used for public transportation could also be modified to improve the security of both the driver and the riders. The driver could be required to enter a valid password on the terminal before the vehicle could be started or the hood opened. This would reduce the chance of vehicle theft. The vehicles could also be modified to prevent the driver from speeding while the vehicle was used for public transportation. Furthermore, the keyboard used for entering identification or trip information could also be used as a means of testing the driver's dexterity prior to assigning riders or prior to permitting the vehicle to be started.

For vehicles equipped with wireless terminals, it would be possible to have the driver or passenger log-in when the pickup or delivery were made. This would not only provide better security, it would also permit the computer to assign additional riders to the vehicle at that time. This approach would increase both the efficiency and the effectiveness of the transportation system.

In highly congested areas, with multistoried office and apartment buildings, it may be difficult to provide door-to-door pickup services during peak traffic hours. Under these circumstances it may be desirable to specify a sidewalk location as a common pickup point for all riders going to a given neighborhood. The rider would request a vehicle as described earlier, but the only origin point that the central computer would accept during peak hours would be the designated pickup location. Similarly, during peak load hours, drivers in certain areas could be directed to use a common pickup point as their origin to reduce traffic congestion. In this case, where the specific origin of any rider or driver going from a certain general area to a given neighborhood is predetermined, the central computer could direct the driver to the respective rider only by rider identity, and not by rider origin since the origin is already known to the driver.

Another use of the system that would also save fuel, and reduce traffic congestion and air pollution problems, would be to move packages or other cargo in place of riders, particularly in trucks and vans. Instead of seating capacity the driver could specify cargo space availability, in cubic feet for example, and the shipper (taking the place of a rider) would specify space requirements instead of seat requirements. Billings for the shipper could be prepared automatically by the central computer and credits prepared for the driver or vehicle owner. Because of this alternative application of the system, the term "ride-user" in the claims herein is intended to include either a rider or a shipper, and the term "amount of space" is intended to include either number of passenger seats or cargo space.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An automatic system for providing public ride-user access to transportation by driver-operated vehicles, each vehicle having independent variable origins and destinations and routes therebetween determined by its driver, said system comprising:
   (a) a central coordinating station comprising means for receiving ride-offer electromagnetic signals, indicative of driver-selected origins and destinations, and ride-request electromagnetic signals, indicative of ride-user-selected origins and destinations, respectively;
   (b) respective driver terminal means in telecommunication with said central coordinating station, each of said driver terminal means including driver register means for registering a driver-selected origin and variable driver-selected destinations from a plurality of possible destinations having no predetermined route relationship to one another and means for transmitting to said station said ride-offer electromagnetic signals;
   (c) respective ride-user terminal means in telecommunication with said central coordinating station, each of said ride-user terminal means including ride-user register means for registering a ride-user-selected origin and destination not necessarily located identically to said driver-selected origin and destination and means for transmitting to said station said ride-request electromagnetic signals;
   (d) said central coordinating station including logical circuitry means automatically responsive to said ride-offer and ride-request electromagnetic signals respectively for comparing said respective electromagnetic signals with each other and matching together a respective driver and ride-user whose respective origins and destinations as indicated by said signals bear a predetermined geographical relationship to each other even though such respective origins and destinations are not located identically to each other;

(e) said central coordinating station further including means automatically responsive to said respective electromagnetic signals for transmitting electromagnetic message signals to a respective driver directing said respective driver to the respective origin of a ride-user with which said respective driver has been so matched, each of said driver terminal means having receiver means in telecommunication with said central coordinating station for receiving said electromagnetic message signals.

2. The system of claim 1 wherein each of said ride-user register means further includes means for selectively registering variable ride-user-selected destinations from a plurality of possible destinations having no predetermined route relationship to one another.

3. The system of claim 1 wherein said central coordinating station includes means automatically responsive to said ride-request electromagnetic signals for transmitting ride-user-identifying electromagnetic signals, indicative of the identity of a respective ride-user who has transmitted said ride-request signals, to a respective driver with which said respective ride-user has been so matched, each of said driver terminal means having receiver means in telecommunication with said central coordinating station for receiving said ride-user-identifying electromagnetic signals.

4. The system of claim 1 wherein each of said driver register means includes means for selectively registering variable amounts of space in a respective vehicle and transmitting to said central coordinating station space-indicating electromagnetic signals indicative of the amount of space available in the respective vehicle.

5. The system of claim 1 wherein each of said ride-user register means includes means for selectively registering variable amounts of space required and transmitting to said central coordinating station space-identifying electromagnetic signals indicative of the amount of space required.

6. The system of claim 1 wherein each of said driver register means includes means for selectively registering variable times when a driver intends to travel between a respective origin and destination and transmitting to said central coordinating station time-indicating electromagnetic signals indicative of said time.

7. The system of claim 1 wherein each of said ride-user register means includes means for selectively registering variable times when a ride-user requests transportation between a respective origin and destination and transmitting to said central coordinating station time-indicating electromagnetic signals indicative of said time.

8. The system of claim 1 wherein each of said receiver means comprises means for visually displaying variable messages.

9. The system of claim 1 wherein each of said register means includes means for digitally registering variable information.

10. A method for providing public ride-user access to transportation by driver-operated vehicles, each vehicle having independent variable origins and destinations and routes therebetween determined by its driver, said method comprising:

(a) receiving respective ride offers, from a plurality of drivers, in the form of ride-offer electromagnetic signals indicative of respective driver-selected origins and destinations, each ride offer indicating a respective origin and destination having no predetermined route relationship to each other;

(b) receiving respective ride requests, from a plurality of ride-users, in the form of ride-request electromagnetic signals indicative of respective ride-user-selected origins and destinations, each ride request indicating a respective origin and destination not necessarily located identically to said driver-selected origin and destination;

(c) comparing said respective ride-offer and ride-request electromagnetic signals with each other and matching together a respective driver and ride-user whose respective origins and destinations as indicated by said signals bear a predetermined geographical relationship to each other even though such respective origins and destinations are not located identically to each other; and (d) transmitting electromagnetic message signals to a respective driver directing said respective driver to the respective origin of a ride-user with which said respective driver has been so matched.

11. The method of claim 10, further including transmitting ride-user identifying electromagnetic signals, indicative of the identity of a respective ride-user, to a respective driver with which said respective ride-user has been so matched.

12. The method of claim 10, further including receiving space-indicating electromagnetic signals indicative of the amount of space made available by a respective driver in connection with a respective ride offer, receiving space-identifying electromagnetic signals indicative of the amount of space requested by a respective ride-user in connection with a respective ride request, comparing said respective space-identifying electromagnetic signals with each other and matching together a respective driver and ride-user whose respective origins and destinations bear said predetermined geographical relationship to each other and wherein the amount of space made available by the respective driver is at least as great as the amount of space requested by the respective ride-user.

13. The method of claim 10, further including receiving time-indicating electromagnetic signals indicative of the time for which a respective ride-offer is made available by a respective driver, receiving time-indicating electromagnetic signals indicative of the time for which a respective ride is requested by a respective ride-user, comparing said respective time-indicating electromagnetic signals with each other and matching together a respective driver and ride-user whose respective origins and destinations bear said predetermined geographical relationship to each other and whose respective times as indicated by said respective time-indicating signals are both within a predetermined time period.

14. An automatic system for providing public ride-user access to transportation by driver-operated vehicles, each vehicle having independent variable origins and destinations and routes therebetween determined by its driver, said system comprising:

(a) a central coordinating station comprising means for receiving ride-offer electromagnetic signals, indicative of driver-selected origins and destinations, and ride-request electromagnetic signals, indicative of ride-user-selected origins and destinations, respectively;

(b) respective driver terminal means in telecommunication with said central coordinating station, each of said driver terminal means including driver register means for registering a driver-selected origin and variable driver-selected destinations from a plurality of possible destinations having no predetermined route relationship to one another and means for transmitting to said station said ride-offer electromagnetic signals;

(c) respective ride-user terminal means in telecommunication with said central coordinating station, each of said ride-user terminal means including ride-user register means for registering a ride-user-selected origin and destination and means for transmitting to said station said ride-request electromagnetic signals;

(d) said central coordinating station including logical circuitry means automatically responsive to said ride-offer and ride-request electromagnetic signals respectively for comparing said respective electromagnetic signals with each other and matching together a respective driver and ride-user whose respective origins and destinations as indicated by said signals bear a predetermined geographical relationship to each other;

(e) said central coordinating station further including means automatically responsive to said respective electromagnetic signals for transmitting electromagnetic message signals to a respective driver directing said respective driver to a respective ride-user with which said respective driver has been so matched, each of said driver terminal means having receiver means in telecommunication with said central coordinating station for receiving said electromagnetic message signals;

(f) at least some of said respective driver terminal means comprising mobile terminals in said vehicles which are in wireless communication with said central coordinating station, each of said mobile terminals having driver-register means which includes means for selectively registering variable driver-selected origins from a plurality of possible origins having no predetermined route relationship to one another.

15. An automatic system for providing public ride-user access to transportation by driver-operated vehicles, each vehicle having independent variable origins and destinations and routes therebetween determined by its driver, said system comprising:

(a) a central coordinating station comprising means for receiving ride-offer electromagnetic signals, indicative of driver-selected origins and destinations, and ride-request electromagnetic signals, indicative of ride-user-selected origins and destinations, respectively;

(b) respective driver terminal means in telecommunication with said central coordinating station, each of said driver terminal means including driver register means for registering a driver-selected origin and variable driver-selected destinations from a plurality of possible destinations having no predetermined route relationship to one another and means for transmitting to said station said ride-offer electromagnetic signals;

(c) respective ride-user terminal means in telecommunication with said central coordinating station, each of said ride-user terminal means including ride-user register means for registering a ride-user-selected origin and destination and means for transmitting to said station said ride-request electromagnetic signals;

(d) said central coordinating station including logical circuitry means automatically responsive to said ride-offer and ride-request electromagnetic signals respectivety for comparing said respective electromagnetic signals with each other and matching together a respective driver and ride-user whose respective origins and destinations as indicated by said signals bear a predetermined geographical relationship to each other;

(e) said central coordinating station further including means automatically responsive to said respective electromagnetic signals for transmitting electromagnetic message signals to a respective driver directing said respective driver to a respective ride-user with which said respective driver has been so matched, each of said driver terminal means having receiver means in telecommunication with said central coordinating station for receiving said electromagnetic message signals;

(f) said central coordinating station including means automatically responsive to said ride-offer electromagnetic signals for transmitting vehicle-identifying electromagnetic signals, indicative of the identity of the vehicle driven by a respective driver who has transmitted said ride-offer signals, to a respective ride-user with which said respective driver has been so matched, each of said ride-user terminal means having receiver means in telecommunication with said central coordinating station for receiving said vehicle-identifying electromagnetic signals.

16. An automatic system for providing public ride-user access to transportation by driver-operated vehicles, each vehicle having independent variable origins and destinations and routes therebetween determined by its driver, said system comprising:

(a) a central coordinating station comprising means for receiving ride-offer electromagnetic signals, indicative of driver-selected origins and destinations, and ride-request electromagnetic signals, indicative of ride-user-selected origins and destinations, respectively;

(b) respective driver terminal means in telecommunication with said central coordinating station, each of said driver terminal means including driver register means for registering a driver-selected origin and variable driver-selected destinations from a plurality of possible destinations having no predetermined route relationship to one another and means for transmitting to said station said ride-offer electromagnetic signals;

(c) respective ride-user terminal means in telecommunication munication with said central coordinating station, each of said ride-user terminal means including ride-user register means for registering a ride-user-selected origin and destination and means for transmitting to said station said ride-request electromagnetic signals;

(d) said central coordinating station including logical circuitry means automatically responsive to said ride-offer and ride-request electromagnetic signals respectively for comparing said respective electromagnetic signals with each other and matching together a respective driver and ride-user whose respective origins and destinations as indicated by said signals bear a predetermined geographical relationship to each other;

(e) said central coordinating station further including means automatically responsive to said respective electromagnetic signals for transmitting electromagnetic message signals to a respective driver directing said respective driver to a respective ride-user with which said respective driver has been so matched, each of said driver terminal means having receiver means in telecommunication with said central coordinating station for receiving said electromagnetic message signals;

(f) said central coordinating station including means automatically responsive to said ride-request electromagnetic signals for transmitting origin-identifying electromagnetic signals, indicative of the origin of a respective ride-user who has transmitted said ride-request signals, to a respective driver with which said respective ride-user has been so matched, each of said driver terminal means having receiver means in telecommunication with said central coordinating station for receiving said origin-identifying signals.

17. An automatic system for providing public ride-user access to transportation by driver-operated vehicles, each vehicle having independent variable origins and destinations and routes therebetween determined by its driver, said system comprising:

(a) a central coordinating station comprising means for receiving ride-offer electromagnetic signals, indicative of driver-selected origins and destinations, and ride-request electromagnetic signals, indicative of ride-user-selected origins and destinations, respectively;

(b) respective driver terminal means in telecommunication with said central coordinating station, each of said driver terminal means including driver register means for registering a driver-selected origin and variable driver-selected destinations from a plurality of possible destinations having no predetermined route relationship to one another and means for transmitting to said station said ride-offer electromagnetic signals;

(c) respective ride-user terminal means in telecommunication with said central coordinating station, each of said ride-user terminal means including ride-user register means for registering a ride-user-selected origin and destination and means for transmitting to said station said ride-request electromagnetic signals;

(d) said central coordinating station including logical circuitry means automatically responsive to said ride-offer and ride-request electromagnetic signals respectively for comparing said respective electromagnetic signals with each other and matching together a respective driver and ride-user whose respective origins and destinations as indicated by said signals bear a predetermined geographical relationship to each other;

(e) said central coordinating station further including means automatically responsive to said respective electromagnetic signals for transmitting electromagnetic message signals to a respective driver directing said respective driver to a respective ride-user with which said respective driver has been so matched, each of said driver terminal means having receiver means in telecommunication with said central coordinating station for receiving said electromagnetic message signals;

(f) each of said driver register means including means for selectively registering variable driver identities and variable coded identity-verification indicia associated with each driver identity, said system further including storage means containing security data matching driver identities with predetermined coded identity-verification indicia associated with each driver identity and means automatically responsive to said driver register means for comparing said driver identities and coded identity-vertification indicia registered thereon with said security data.

18. An automatic system for providing public ride-user access to transportation by driver-operated vehicles, each vehicle having independent variable origins and destinations and routes therebetween determined by its driver, said system comprising:

(a) a central coordinating station comprising means for receiving ride-offer electromagnetic signals, indicative of driver-selected origins and destinations, and ride-request electromagnetic signals, indicative of ride-user-selected origins and destinations, respectively;

(b) respective driver terminal means in telecommunication with said central coordinating station, each of said driver terminal means including driver register means for registering a driver-selected origin and variable driver-selected destinations from a plurality of possible destinations having no predetermined route relationship to one another and means for transmitting to said station said ride-offer electromagnetic signals;

(c) respective ride-user terminal means in telecommunication with said central coordinating station, each of said ride-user terminal means including ride-user register means for registering a ride-user-selected origin and destination and means for transmitting to said station said ride-request electromagnetic signals;

(d) said central coordinating station including logical circuitry means automatically responsive to said ride-offer and ride-request electromagnetic signals respectively for comparing said respective electromagnetic signals with each other and matching together a respective driver and ride-user whose respective origins and destinations as indicated by said signals bear a predetermined geographical relationship to each other;

(e) said central coordinating station further including means automatically responsive to said respective electromagnetic signals for transmitting electromagnetic message signals to a respective driver directing said respective driver to a respective ride-user with which said respective driver has been so matched, each of said driver terminal means having receiver means in telecommunication with said central coordinating station for receiving said electromagnetic message signals;

(f) each of said ride-user register means including means for selectively registering variable ride-user identities and variable coded identity-verfication indicia associated with each ride-user identity, said system further including storage means containing security data matching ride-user identities with predetermined coded identity-verification indicia associated with each ride-user identity and means automatically responsive to said ride-user register means for comparing said ride-user identities and coded identity-verification indicia registered thereon with said security data.

19. An automatic system for providing public ride-user access to transportation by driver-operated vehicles, each vehicle having independent variable origins and destinations and routes therebetween determined by its driver, said system comprising:
   (a) a central coordinating station comprising means for receiving ride-offer electromagnetic signals, indicative of driver-selected origins and destinations, and ride-request electromagnetic signals, indicative of ride-user selected origins and destinations, respectively;
   (b) respective driver terminal means in telecommunication with said central coordinating station, each of said driver terminal means including driver register means for registering a driver-selected origin and variable driver-selected destinations from a plurality of possible destinations having no predetermined route relationship to one another and means for transmitting to said station said ride-offer electromagnetic signals;
   (c) respective ride-user terminal means in telecommunication with said central coordinating station, each of said ride-user terminal means including ride-user register means for registering a ride-user-selected origin and destination and means for transmitting to said station said ride-request electromagnetic signals;
   (d) said central coordinating station including logical circuitry means automatically responsive to said ride-offer and ride-request electromagnetic signals respectively for comparing said respective electromagnetic signals with each other and matching together a respective driver and ride-user whose respective origins and destinations as indicated by said signals bear a predetermined geographical relationship to each other;
   (e) said central coordinating station further including means automatically responsive to said respective electromagnetic signals for transmitting electromagnetic message signals to a respective driver directing said respective driver to a respective ride-user with which said respective driver has been so matched, each of said driver terminal means having receiver means in telecommunication with said central coordinating station for receiving said electromagnetic message signals;
   (f) said central coordinating station including storage means containing variable eligibility data regarding the eligibility of respective vehicles to provide transportation and means automatically responsive to said ride-offer electromagnetic signals for comparing the identity of a respective vehicle for which said ride-offer signals have been transmitted with the eligibility data pertaining to said respective vehicle.

20. An automatic system for providing public ride-user access to transportation by driver-operated vehicles, each vehicle having independent variable origins and destinations and routes therebetween determined by its driver, said system comprising:
   (a) a central coordinating station comprising means for receiving ride-offer electromagnetic signals, indicative of driver-selected origins and destinations, and ride-request electromagnetic signals, indicative of ride-user-selected origins and destinations, respectively;
   (b) respective driver terminal means in telecommunication with said central coordinating station, each of said driver terminal means including driver register means for registering a driver-selected origin and variable driver-selected destinations from a plurality of possible destinations having no predetermined route relationship to one another and means for transmitting to said station said ride-offer electromagnetic signals;
   (c) respective ride-user terminal means in telecommunication with said central coordinating station, each of said ride-user terminal means including ride-user register means for registering a ride-user-selected origin and destination and means for transmitting to said station said ride-request electromagnetic signals;
   (d) said central coordinating station including logical circuitry means automatically responsive to said ride-offer and ride-request electromagnetic signals respectively for comparing said respective electromagnetic signals with each other and matching together a respective driver and ride-user whose respective origins and destinations as indicated by said signals bear a predetermined geographical relationship to each other;
   (e) said central coordinating station further including means automatically responsive to said respective electromagnetic signals for transmitting electromagnetic message signals to a respective driver directing said respective driver to a respective ride-user with which said respective driver has been so matched, each of said driver terminal means having receiver means in telecommunication with said central coordinating station for receiving said electromagnetic message signals;
   (f) said central coordinating station including storage means containing variable eligibility data regarding the eligibility of respective drivers to provide transportation and means automatically responsive to said ride-offer electromagnetic signals for comparing the identity of a respective driver who has transmitted said ride-offer signals with the eligibility data pertaining to said respective driver.

21. An automatic system for providing public ride-user access to transportation by driver-operated vehicles, each vehicle having independent variable origins and destinations and routes therebetween determined by its driver, said system comprising:
   (a) a central coordinating station comprising means for receiving ride-offer electromagnetic signals, indicative of driver-selected origins and destinations, and ride-request electromagnetic signals, indicative of ride-user-selected origins and destinations, respectively;
   (b) respective driver terminal means in telecommunication with said central coordinating station, each of said driver terminal means including driver register means for registering a driver-selected origin and variable driver-selected destinations from a plurality of possible destinations having no predetermined route relationship to one another and means for transmitting to said station and said ride-offer electromagnetic signals;

(c) respective ride-user terminal means in telecommunication with said central coordinating station, each of said ride-user terminal means including ride-user register means for registering a ride-user-selected origin and destination and means for transmitting to said station said ride-request electromagnetic signals;

(d) said central coordinating station including logical circuitry means automatically responsive to said ride-offer and ride-request electromagnetic signals respectively for comparing said respective electromagnetic signals with each other and matching together a respective driver and ride-user whose respective origins and destinations as indicated by said signals bear a predetermined geographical relationship to each other;

(e) said central coordinating station further including means automatically responsive to said respective electromagnetic signals for transmitting electromagnetic message signals to a respective driver directing said respective driver to a respective ride-user with which said respective driver has been so matched, each of said driver terminal means having receiver means in telecommunication with said central coordinating station for receiving said electromagnetic message signals;

(f) said central coordinating station including storage means containing variable eligibility data regarding the eligibility of respective ride-users to obtain transportation and means automatically responsive to said ride-request electromagnetic signals for comparing the identity of a respective ride-user who has transmitted said ride-request signals with the eligibility data pertaining to said respective ride-user.

22. An automatic system for providing public ride-user access to transportation by driver-operated vehicles, each vehicle having independent variable origins and destinations and routes therebetween determined by its driver, said system comprising:
(a) a central coordinating station comprising means for receiving ride-offer electromagnetic signals, indicative of driver-selected origins and destinations, and ride-request electromagnetic signals, indicative of ride-user selected origins and destinations, respectively;
(b) respective driver terminal means in telecommunication with said central coordinating station, each of said driver terminal means including driver register means for registering a driver-selected origin and variable driver-selected destinations from a plurality of possible destinations having no predetermined route relationship to one another and means for transmitting to said station said ride-offer electromagnetic signals;
(c) respective ride-user terminal means in telecommunication with said central coordinating station, each of said ride-user terminal means including ride-user register means for registering a ride-user-selected origin and destination and means for transmitting to said station said ride-request electromagnetic signals;
(d) said central coordinating station including logical circuitry means automatically responsive to said ride-offer and ride-request electromagnetic signals respectively for comparing said respective electromagnetic signals with each other and matching together a respective driver and ride-user whose respective origins and destinations as indicated by said signals bear a predetermined geographical relationship to each other;

(e) said central coordinating station further including means automatically responsive to said respective electromagnetic signals for transmitting electromagnetic message signals to a respective driver directing said respective driver to a respective ride-user with which said respective driver has been so matched, each of said driver terminal means having receiver means in telecommunication with said central coordinating station for receiving said electromagnetic message signals;

(f) at least some of said respective terminal means including register means for registering variable geographical location-identifying coded indicia each uniquely associated with a respective origin or destination, said system further including storage means containing data matching geographical descriptions of respective origins or destinations with said respective coded indicia and means automatically responsive to the entry of a respective one of said coded indicia on said register means for transmitting electromagnetic signals indicative of the respective geographical description matched by said storage means with said respective one of said coded indicia.

23. The system of claim 22 wherein said storage means includes means containing data matching geographical descriptions of both an origin and a destination with a respective one of said coded indicia and means responsive to the entry of said respective one of said coded indicia on said register means for transmitting electromagnetic signals indicative of both of said geographical descriptions.

24. The system of claim 22 or 23 wherein at least some of said respective terminal means includes said storage means as a portion thereof remote from said central coordinating station.

25. The system of claim 22 or 23 wherein at least some of said respective terminal means include means for permitting at least a portion of said storage means to be selectively connected operatively and removably to said terminal means from the exterior thereof by a user of said terminal means.

26. A method for providing public ride-user access to transportation by driver-operated vehicles, each vehicle having independent variable origins and destinations and routes therebetween determined by its driver and at least some of said vehicles having mobile wireless terminals therein, said method comprising:
(a) receiving respective ride offers, from a plurality of drivers, in the form of ride-offer electromagnetic signals transmitted by said mobile wireless terminals indicative of respective driver-selected origins and destinations, each ride offer indicating a respective origin and destination having no predetermined route relationship to each other;
(b) receiving respective ride requests, from a plurality of ride-users, in the form of ride-request electromagnetic signals indicative of respective ride-user-selected origins and destinations, each ride request indicating a respective origin and destination having no predetermined route relationship to each other;
(c) comparing said respective ride-offer and ride-request electromagnetic signals with each other and matching together a respective driver and ride-user whose respective origins and destinations as indicated by said signals bear a predetermined geographical relationship to each other; and (d) transmitting electromagnetic message signals to a respective driver by transmission thereof to one of said mobile wireless terminals and thereby directing said respective driver to a respective ride-user with which said respective driver has been so matched.

27. A method for providing public ride-user access to transportation by driver-operated vehicles, each vehicle having independent variable origins and destinations and routes therebetween determined by its driver, said method comprising:

(a) receiving respective ride offers, from a plurality of drivers, in the form of ride-offer electromagnetic signals indicative of respective driver-selected origins and destinations, each ride offer indicating a respective origin and destination having no predetermined route relationship to each other;

(b) receiving respective ride requests, from a plurality of ride-users, in the form of ride-request electromagnetic signals indicative of respective ride-user-selected origins and destinations, each ride request indicating a respective origin and destination having no predetermined route relationship to each other;

(c) comparing said respective ride-offer and ride-request electromagnetic signals with each other and matching together a respective driver and ride-user whose respective origins and destinations as indicated by said signals bear a predetermined geographical relationship to each other;

(d) transmitting electromagnetic message signals to a respective driver directing said respective driver to a respective ride-user with which said respective driver has been so matched; and (e) transmitting, automatically in response to said ride-offer electromagnetic signals, vehicle-identifying electromagnetic signals, indicative of the identity of a vehicle driven by a respective driver, to a respective ride-user with which said respective driver has been so matched.

28. A method for providing public ride-user access to transportation by driver-operated vehicles, each vehicle having independent variable origins and destinations and routes therebetween determined by its driver, said method comprising:

(a) receiving respective ride offers, from a plurality of drivers, in the form of ride-offer electromagnetic signals indicative of respective driver-selected origins and destinations, each ride offer indicating a respective origin and destination having no predetermined route relationship to each other;

(b) receiving respective ride requests, from a plurality of ride-users, in the form of ride-request electromagnetic signals indicative of respective ride-user-selected origins and destinations, each ride request indicating a respective origin and destination having no predetermined route relationship to each other;

(c) comparing said respective ride-offer and ride-request electromagnetic signals with each other and matching together a respective driver and ride-user whose respective origins and destinations as indicated by said signals bear a predetermined geographical relationship to each other;

(d) transmitting electromagnetic message signals to a respective driver directing said respective driver to a respective ride-user with which said respective driver has been so matched; and (e) transmitting, automatically in response to said ride-request electromagnetic signals, origin-identifying electromagnetic signals, indicative of the origin of a respective ride-user, to a respective driver with which said respective ride user has been so matched.

29. A method for providing public ride-user access to transportation by driver-operated vehicles, each vehicle having independent variable origins and destinations and routes therebetween determined by its driver, said method comprising:

(a) receiving respective ride offers, from a plurality of drivers, in the form of ride-offer electromagnetic signals indicative of respective driver-selected origins and destinations, each ride offer indicating a respective origin and destination having no predetermined route relationship to each other;

(b) receiving respective ride requests, from a plurality of ride-users, in the form of ride-request electromagnetic signals indicative of respective ride-user-selected origins and destinations, each ride request indicating a respective origin and destination having no predetermined route relationship to each other;

(c) comparing said respective ride-offer and ride-request electromagnetic signals with each other and matching together a respective driver and ride-user whose respective origins and destinations as indicated by said signals bear a predetermined geographical relationship to each other;

(d) transmitting electromagntic message signals to a respective driver directing said respective driver to a respective ride-user with which said respective driver has been so matched;

(e) storing security data which matches respective driver identities with respective predetermined coded identity-verification indicia uniquely associated with each driver identity;

(f) receiving driver-identifying electromagnetic signals indicative of a respective driver identity and identity-vertification electromagnetic signals indicative of respective coded indicia to be associated with said identity; and (g) comparing said driver-identifying and identity-verification electromagnetic signals, automatically in response to the receipt thereof, with said security data.

30. A method for providing public ride-user access to transportation by driver-operated vehicles, each vehicle having independent variable origins and destinations and routes therebetween determined by its driver, said method comprising:

(a) receiving respective ride offers, from a plurality of drivers, in the form of ride-offer electromagnetic signals indicative of respective driver-selected origins and destinations, each ride offer indicating a respective origin and destination having no predetermined route relationship to each other;

(b) receiving respective ride requests, from a plurality of ride-users, in the form of ride-request electromagnetic signals indicative of respective ride-user-selected origins and destinations, each ride request indicating a respective origin and destination having no predetermined route relationship to each other;
(c) comparing said respective ride-offer and ride-request electromagnetic signals with each other and matching together a respective driver and ride-user whose respective origins and destinations as indicated by said signals bear a predetermined geographical relationship to each other;
(d) transmitting electromagnetic message signals to a respective driver directing said respective driver to a respective ride-user with which said respective driver has been so matched;
(e) storing security data which matches respective ride-user identities with respective predetermined coded identity-verification indicia uniquely associated with each ride-user identity;
(f) receiving ride-user-identifying electromagnetic signals indicative of a respective ride-user identity and identity-verification electromagnetic signals indicative of respective coded indicia to be associated with said indentity; and
(g) comparing said ride-user-identifying and identity-verification electromagnetic signals, automatically in response to the receipt thereof, with said security data.

31. A method for providing public ride-user access to transportation by driver-operated vehicles, each vehicle having independent variable origins and destinations and routes therebetween determined by its driver, said method comprising:
(a) receiving respective ride offers, from a plurality of drivers, in the form of ride-offer electromagnetic signals indicative of respective driver-selected origins and destinations, each ride offer indicating a respective origin and destination having no predetermined route relationship to each other;
(b) receiving respective ride requests, from a plurality of ride-users, in the form of ride-request electromagnetic signals indicative of respective ride-user-selected origins and destinations, each ride request indicating a respective origin and destination having no predetermined route relationship to each other;
(c) comparing said respective ride-offer and ride-request electromagnetic signals with each other and matching together a respective driver and ride-user whose respective origins and destinations as indicated by said signals bear a predetermined geographical relationship to each other;
(d) transmitting electromagnetic message signals to a respective driver directing said respective driver to a respective ride-user with which said respective driver has been so matched;
(e) storing eligibility data regarding the eligibility of respective vehicles to provide transportation;
(f) modifying said eligibility data; and
(g) comparing the identity of a respective vehicle for which ride-offer electromagnetic signals have been received, automatically in response to the receipt of said ride-offer electromagnetic signals, with the modified eligibility data pertaining to said respective vehicle.

32. A method for providing public ride-user access to transportation by driver-operated vehicles, each vehicle having independent variable origins and destinations and routes therebetween determined by its driver, said method comprising:
(a) receiving respective ride offers, from a plurality of drivers, in the form of ride-offer electromagnetic signals indicative of respective driver-selected origins and destinations, each ride offer indicating a respective origin and destination having no predetermined route relationship to each other;
(b) receiving respective ride requests, from a plurality of ride-users, in the form of ride-request electromagnetic signals indicative of respective ride-user-selected origins and destinations, each ride request indicating a respective origin and destination having no predetermined route relationship to each other;
(c) comparing said respective ride-offer and ride-request electromagnetic signals with each other and matching together a respective driver and ride-user whose respective origins and destinations as indicated by said signals bear a predetermined geographical relationship to each other;
(d) transmitting electromagnetic message signals to a respective driver directing said respective driver to a respective ride-user with which said respective driver has been so matched;
(e) storing eligibility data regarding the eligibility of respective drivers to provide transportation;
(f) modifying said eligibility data; and
(g) comparing the identify of a respective driver from which ride-offer electromagnetic signals have been received, automatically in response to the receipt of said ride-offer electromagnetic signals, with the modified eligibility data pertaining to said respective driver.

33. A method for providing public ride-user access to transportation by driver-operated vehicles, each vehicle having independent variable origins and destinations and routes therebetween determined by its driver, said method comprising:
(a) receiving respective ride offers, from a plurality of drivers, in the form of ride-offer electromagnetic signals indicative of respective driver-selected origins and destinations, each ride offer indicating a respective origin and destination having no predetermined route relationship to each other;
(b) receiving respective ride requests, from a plurality of ride-users, in the form of ride-request electromagnetic signals indicative of respective ride-user-selected origins and destinations, each ride request indicating a respective origin and destination having no predetermined route relationship to each other;
(c) comparing said respective ride-offer and ride-request electromagnetic signals with each other and matching together a respective driver and ride-user whose respective origins and destinations as indicated by said signals bear a predetermined geographical relationship to each other;
(d) transmitting electromagnetic message signals to a respective driver directing said respective driver to a respective ride-user with which said respective driver has been so matched;
(e) storing eligibility data regarding the eligibility of respective ride-users to obtain transportation;
(f) modifying said eligibility data; and
(g) comparing the identify of a respective ride-user from which ride-request electromagnetic signals have been received, automatically in response to the receipt of said ride-request electromagnetic signals, with the modified eligibility data pertaining to said respective ride-user.

* * * * *

UNITED STATES PATENT AND TRADEMARK OFFICE
CERTIFICATE OF CORRECTION

PATENT NO. : 4,360,875
DATED : November 23, 1982
INVENTOR(S) : Robert W. Behnke

It is certified that error appears in the above-identified patent and that said Letters Patent are hereby corrected as shown below:

Col. 6, line 11   Change "on" to --an--.

Col. 12, line 15  Change "birthday" to --birthdate--.

Col. 13, line 20  Change "terminals's" to --terminal's--.

Signed and Sealed this

Fifteenth Day of March 1983

[SEAL]

Attest:

GERALD J. MOSSINGHOFF

Attesting Officer          Commissioner of Patents and Trademarks